United States Patent
McWilliams

[15] 3,699,649
[45] Oct. 24, 1972

[54] METHOD OF AND APPARATUS FOR REGULATING THE RESISTANCE OF FILM RESISTORS

[72] Inventor: Donald A. McWilliams, 1916 North Gilbert, Fullerton, Calif. 92633

[22] Filed: Nov. 5, 1969

[21] Appl. No.: 874,227

[52] U.S. Cl. .................. 29/610, 29/620, 219/121 L, 350/96 R
[51] Int. Cl. ............................................ H01c 17/00
[58] Field of Search.......................................29/610, 620, 121 L, 121 EB; 350/96 R

[56] References Cited

UNITED STATES PATENTS

| | | | |
|---|---|---|---|
| 3,382,343 | 5/1968 | Muncheryan | 219/121 |
| 3,383,491 | 5/1968 | Muncheryan | 219/121 |
| 3,388,461 | 6/1968 | Lins | 29/620 X |
| 3,534,472 | 10/1970 | De Jong et al. | 29/620 |
| 3,535,778 | 10/1970 | Falanga et al. | 29/610 |

*Primary Examiner*—John F. Campbell
*Assistant Examiner*—Victor A. Di Palma
*Attorney*—Jack M. Wiseman and Thomas E. Schatzel

[57] ABSTRACT

Method and apparatus for automatically trimming film resistors in production quantities. The method includes the steps of placing a substrate with a film resistance to be trimmed on a support beneath a grid mask of desired pattern; extending fiber optics from the grid mask to a fiber optic receiving support; directing a laser beam towards the receiving support; and moving the receiving support relative to the beam in a controlled manner. Apparatus may include a support table for supporting a substrate carrying a film to be trimmed in position to be in contact with a set of electrical probes connected with a sensor circuit for monitoring the actual resistance value of the film. Positioned above the film and substrate is a fixed aperture mask carrying the geometric requirements of the circuit with openings at required precision adjustment points. A fiber optic pipe joins each opening so as to focus light conducted by the fiber optic in the thin film plane of the resistor matrix. The fiber optic light pipes terminate in a common plane to receive a laser beam. The receiving end of the fiber optic light pipes and the laser beam are movable relative to one another so that the beam may be directed to select pipes. The relative movement is controlled dependent upon the desired pattern and actual monitored resistance value.

18 Claims, 3 Drawing Figures

PATENTED OCT 24 1972 3,699,649

*INVENTOR.*
DONALD A. McWILLIAMS
BY Jack M. Wiseman
Thomas E. Schatzel
ATTORNEYS

3,699,649

METHOD OF AND APPARATUS FOR REGULATING THE RESISTANCE OF FILM RESISTORS

BACKGROUND OF THE INVENTION

The present invention relates to regulating the value of film resistors in the manufacturing process. Heretofore, there have been various techniques utilized for regulating the values of thick film and thin film resistors. Such techniques are time consuming and incorporate expensive equipment. A particular technique may include a laser optical system aimed at a fixed point in space. A resistor for trimming is placed beneath the laser at the focal point of the laser. This resistor is positioned either manually or by some motor driven automatic or semi-automatic mechanical table. After the resistor is in place, probes are lowered on the resistor or other electrical connections are made. The electrical connections extend to a bridge circuit including a sensor within the system to determine the resistance value of the resistor. The laser trimming operation then begins. The laser cuts away portions of the resistor at the focal point increasing the effective resistance of the resistor. This technique is generally recognized as being time consuming and expensive. In particular, the mechanical table used to position the complex substrate is relatively expensive in cost as it requires considerable precision to locate the resistor and this precision must be available for several inches of substrate distance. The relatively high degree of cost and time consumption may be attributed to it being a mechanical inconsistency to require high speed operation over a long distance while simultaneously obtaining great precision in the final location of the table. For example, in the prior art applications, it is generally required that precision of a thick film resistor substrate be within two- or three-thousands of an inch. Obviously, these requirements are difficult to realize without incurring excessive time and expense.

SUMMARY OF THE PRESENT INVENTION

The present invention teaches a method and apparatus which isolates the technique of precision location from the high speed stepping function and eliminates the necessity of a precision mechanical table. The method and apparatus herein is adapted to provide low cost, high production, fully automatic precision adjustment of thick film and thin film resistor substrates. The resistor substrate may be either a part of an electronic integrated circuit or a discrete individual component.

In an exemplary embodiment, the resistor substrate with film to be regulated is positioned on a mechanical table preferably by automatic feed machinery. The substrate is then positioned on the table to engage a set of probes which extend to a monitor sensing network for monitoring the resistance value during adjustment. A mask of a grid pattern based on the geometric requirements of the desired circuit of the film is positioned above the substrate. The mask carries openings at required precision adjustment points. Fiber optic components with appropriate focusing characteristics are joined to the points and focus light conducted by the fiber optics. The location of the openings within the mask holding the fiber optic conductor can be set with precision utilizing optical and photoresist processing techniques. The receiving ends of the fiber optic light pipes are then aligned at a support in a single line to receive a laser beam. The support at the receiving end of the light pipes is movable relative to the beam, such that the receiving ends may be rapidly placed in sequence by stepping or other procedures within the path of the laser beam such that individual pipes conduct light to the mask and on the film. The moving sequence may be coordinated with a programed network which predetermines the final desired resistance value. The laser may be arranged to be responsive to the monitor circuit such that each resistor is individually and automatically trimmed to its final desired value.

DESCRIPTION OF THE PREFERRED EMBODIMENT

Figure 1:
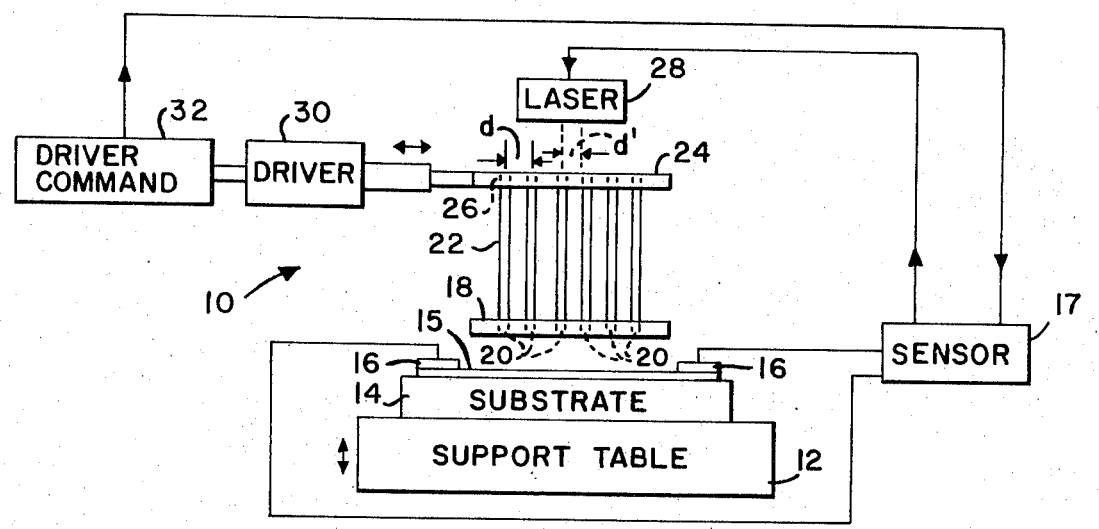
FIG. 1 illustrates diagrammatically apparatus incorporating the teachings of the present invention and shown in conjunction with a resistor.

FIG. 1 diagrammatically illustrates apparatus for practicing the teachings of the present invention. The apparatus, referred to by the general reference character 10, comprises a mechanical support table 12 for receiving a substrate 14 with a resistance film 15, the resistance value of which is to be regulated. The table 12 may be designed to be raised and lowered such that after the substrate 14 is placed on the top of the table 12 it may then be raised by automatic feed machinery to contact a set of probes 16 adapted to provide electrical connection between the thin film substrate circuit and an internal sensor network 17 adapted to provide a reading and monitor the resistance value of the film circuit on the substrate. Immediately above the probes 16 is a fixed aperture mask 18 having a pattern based on the the geometric pattern requirements of the desired circuit. The mask generally carries an opening 20 at each required precision adjustment point to be assumed by the film. Into each of the openings 20 is inserted an optical fiber component 22 with appropriate focusing characteristics to focus conducted light in the plane of the resistor substrate 14. The location of the openings 20 within the mask 18 can be as precise as optical techniques and photoresist processing permit. For example, precision better than 100 micro inches may be readily realized. The fiber optic light pipes 22 or other suitable light pipes are then gathered at their respective receiving ends at a support member 24 forming a common plane parallel to the mask 18. The support member 24 carries a plurality of apertures 26 of centers spaced a distance $d$. Above the member 24 is a laser 28 generating a beam of a diameter $d'$ which is slightly less than the dimension $d$. The support 24 is designed to be movable laterally relative to the laser beam. The optic pipes are flexible sufficiently to be moved at their receiving ends such that the various select apertures 26 are aligned with the beam. The steps may be realized through simple mechanical techniques which need only be within a precision of approximately one-sixteenth of an inch. For example, the support 24 may be linked with a mechanical stepping driver 30 which in turn is operatively responsive to a driver command network 32. Thus, the fiber optic receiving ends at the support 24 are placed rapidly in sequence by stepping procedures beneath the laser beam 28. The stepping operations coordinated by the driver command 32 which may be in the form of a tape program which predetermines the final desired resistor value of each resistor at each step. The sensor 17 is coordinated with the command 32 and generates control signals for controlling the laser so that the resistor film 15 on the substrate 14 is automatically trimmed to its final desired value.

Figure 2:
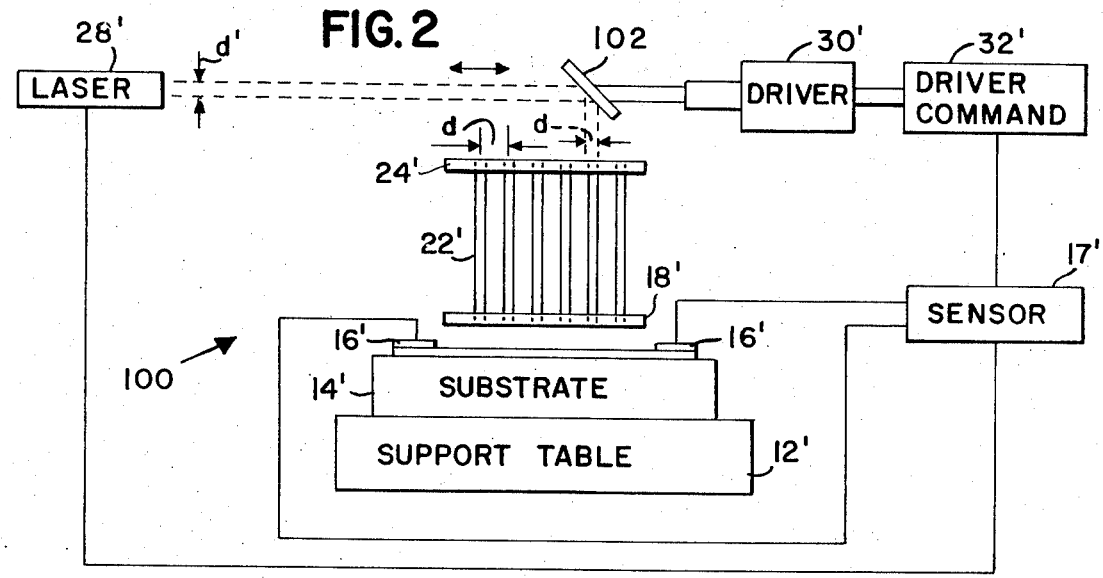
FIG. 2 illustrates a modification of the apparatus shown in FIG. 1 which also embodies the teachings of the present invention.
Figure 3:
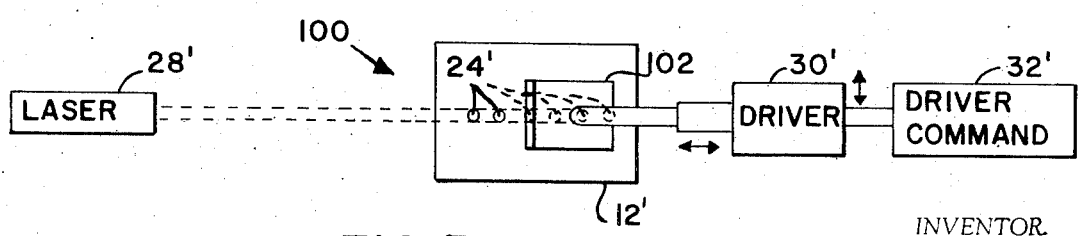
FIG. 3 illustrates a top view of the apparatus shown in FIG. 2.

FIGS. 2 and 3 depict modified apparatus to further illustrate the teachings of the present invention and referred to by the general reference character 100. Elements similar to those of FIG. 1 carry the same reference numeral designated by a prime. In the apparatus 100, the beam from the laser 28' is directed in a plane parallel with the support 24' and the mask 18'. The beam is directed at a mirror 102 positioned at a 45° angle relative to the beam and towards the support 24'. The beam from the laser 28' is diverted into the individual light pipes 22' by the mirror 102. The mirror 102 may travel laterally and longitudinally above the fiber optic light pipes 22' and the support 24' so as to intercept the laser beam and direct it into the top of specific pipes 22'. Accordingly, during the trimming operation, only the mirror is moved. The movement of the mirror 102 may be controlled by the driver 30' and the driver command 32' similar to the manner the support 24 is controlled in FIG. 1. The mirror 102 may be of light weight and controlled in a stepping fashion very rapidly with a minimum amount of mechanical apparatus while the remainder of the apparatus is relatively stationary.

The above described invention provides versatile method and apparatus for the trimming of film resistors in a manufacturing process. The stepping operation of placing the beam relative to the substrate is isolated from the step of directing the beam onto the film itself. The only element that need be replaced in the system for different resistor substrates is the low cost aperture mask which locates the bottom end of the fiber optic light pipes. Fine trimming precision is realized while providing a more rapid operation and more economical operation over that of methods heretofore known to the inventor. Due to the minimal number of moving parts, mechanical failure is considerably reduced.

I claim:

1. A method of trimming film resistors comprising the steps of:

placing a substrate with the film resistor to be trimmed on an article support beneath a grid mask of a desired pattern, projecting a laser beam toward a fiber optic receiving support, conducting the laser beam by fiber optic means from the fiber optic receiving support to the grid mask for impingement of the laser beam on the film resistor to trim the film resistor, and moving the fiber optic receiving support relative to the projecting laser beam in a controlled manner for controlling the intensity of the laser beam impinging on the film resistor.

2. The method of claim 1 and further including the step of monitoring the resistance value of the film by sensing the resistance thereof through probes and a sensor network.

3. The method of claim 2 and further including the step of controlling the intensity of the laser beam in response to a monitoring signal.

4. The method of claim 3 in which the receiving support and the beam are moved relative to one another in discrete steps.

5. Apparatus for trimming film resistor comprising, in combination:

a laser beam source for generating a laser beam, a plurality of fiber optic means with receiving ends to receive the laser beam, a mask of a select grid pattern with a plurality of openings, each of said openings receiving respectively one of said fiber optic means, a support for supporting a film resistor substrate beneath and in alignment with the mask, and means for imparting relative movement between the laser beam and said receiving ends of said plurality of fiber optic means.

6. The apparatus of claim 5 and including a support member for supporting the receiving ends of said plurality of fiber optic means in a select format.

7. The apparatus of claim 6 in which the support member supports said receiving ends of the plurality of fiber optic means in an aligned pattern.

8. The apparatus of claim 7 in which the support member supports said receiving ends of the plurality of fiber optic means in an aligned pattern with the spacing between centers of the openings exceeding the diameter of the beam.

9. The apparatus of claim 7 and further including a monitor for monitoring the resistance value of the film on said film resistor substrate by sensing the resistance thereof through probes and a sensor network.

10. The apparatus of claim 9 in which the monitor provides a control signal for controlling the intensity of the laser beam in response to the resistance value of said film.

11. The apparatus of claim 10 and further including driver means for moving the support member across the laser beam in a controlled format.

12. The apparatus of claim 11 in which the driver means is adapted to move the support member in discrete steps in response to a command.

13. The apparatus of claim 10 and further including mirror means for receiving the laser beam and directing the laser beam toward the support member and the receiving ends of the plurality of fiber optic means.

14. The apparatus of claim 13 and further including driver means for moving the mirror means relative to the support member.

15. The apparatus of claim 14 in which the driver means is adapted to move the mirror means in discrete steps relative to the support member in response to command signals.

16. A method of trimming film resistors comprising the steps of:
  placing a substrate with the film resistor to be trimmed on an article support beneath a grid mask of a desired pattern,
  projecting a laser bean toward an optic receiving support,
  conducting the laser beam by optic means from the optic receiving support to the grid mask for impingement of the laser beam on the film resistor to trim the film resistor, and
  moving the optic receiving support relative to the projecting laser beam in a controlled manner for controlling the intensity of the laser beam impinging on the film resistor.

17. Apparatus for trimming film resistors comprising, in combination:
  a laser beam source for generating a laser beam,
  a plurality of optic means with receiving ends to receive the laser beam,
  a mask of a select grid pattern with a plurality of openings, each of said openings receiving respectively one of said optic means,
  a support for supporting a film resistor substrate beneath and in alignment with the mask, and
  means for imparting relative movement between the laser beam and said receiving ends of said plurality of optic means.

18. Apparatus for trimming film resistors as claimed in claim 17 wherein each of said optic means is an optic light pipe.

* * * * *